Figure 1:
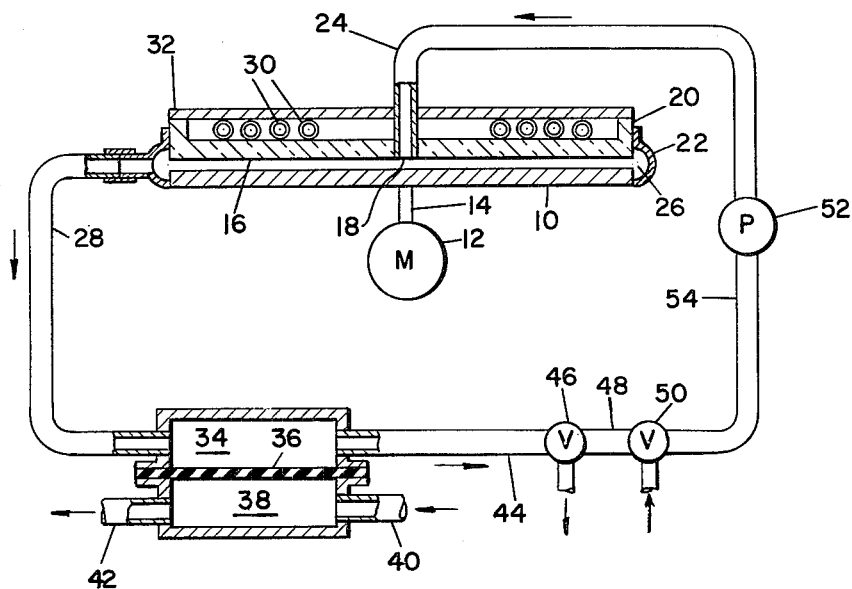

Nov. 23, 1965    J. J. KONIKOFF    3,218,758
PHOTOSYNTHETIC APPARATUS
Filed Dec. 20, 1962    2 Sheets-Sheet 1

INVENTOR.
JOHN J. KONIKOFF
BY
ATTORNEY

United States Patent Office 3,218,758
Patented Nov. 23, 1965

3,218,758
PHOTOSYNTHETIC APPARATUS
John J. Konikoff, Laverock, Pa., assignor to General Electric Company, a corporation of New York
Filed Dec. 20, 1962, Ser. No. 246,132
3 Claims. (Cl. 47—1.4)

This invention relates generally to apparatus for facilitating the growth of photosynthetic microorganisms and more particularly, to an improved apparatus for the cultivation of algae.

Photosynthesis is the process by which plants containing chlorophyll utilize carbon dioxide and water to make carbohydrates when they are exposed to light under suitable ambient temperatures. A by-product of this process is oxygen.

The advent of long manned spaceflights has presented many new problems; not the least of which is to provide sufficient oxygen to sustain the health of the astronauts. Flights extending for months and possibly years are now being predicted, and it is recognized that only by processing a given air supply to remove carbon dioxide and add oxygen will these flights be possible. The previously mentioned process of photosynthesis has attracted interest because it meets these basic requirements.

Algae are a microorganism which carry out the process of photosynthesis in their growing. They have the advantage that their growth is vigorous and easily promoted under proper laboratory conditions. Potentially at least, algae therefore represent a solution to the problem of providing oxygen for space voyages. Whether this potential can be realized depends on a number of factors. Primarily, the apparatus used must be more compact and lighter than chemical means to accomplish the same result. An additional factor recommending the use of algae is that they are a potential source of food for man.

It has been calculated that 2.3 kilograms, wet weight, of algae are needed to supply the oxygen requirements of one man. In addition to the algae, a water and nutrient solution is required in which the algae can be grown. Initial investigations indicated that only one percent of the total volume of algae and solution (the culture) could be algae. This limitation was imposed since it was thought that a more dense algal culture would not permit light sufficient to foster growth to penetrate to all cells. Subsequently, methods of circulating the culture and of maintaining the culture in a thin film were devised which have enabled the density of the culture to be increased so that algae represent ten percent of the total volume. These prior methods, while suitable for use in a laboratory, require equipment of great weight and volume.

A requirement, therefore, exists for a compact, lightweight apparatus which can be used to facilitate the growth of large quantities of algae.

It is, therefore, an object of this invention to provide apparatus for the cultivation of algae which will be both compact and lightweight.

It is also an object of this invention to provide such an apparatus which will facilitate the growth of algae in cultures having ten percent or more algae.

In carrying out the invention in one form, the culture of algae is deposited at the center of a rotating disc. The rotation of the disc causes the culture to be spread in a thin film as it flows to the edge of the disc. A source of light is positioned to shine on the culture while it is flowing over the rotating disc in a thin film. The culture may, therefore, be dense and yet still be adequately illuminated.

The culture is next transferred to a gas exchanging device in which oxygen is removed from the culture and carbon dioxide is added. The culture is then returned to the rotating disc for further illumination.

Periodically, additional nutrient is added to the culture, and, since growth is constantly occurring, some algae must be removed from the system.

Figure 2:
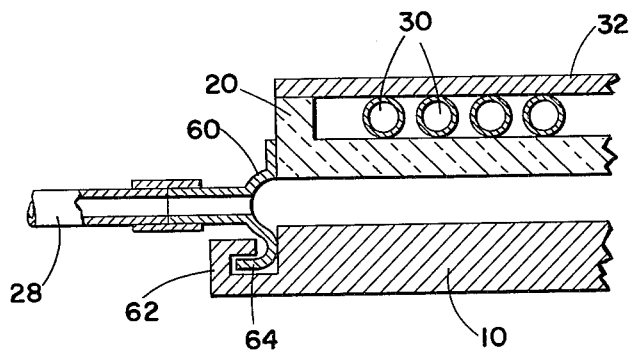

The invention will be better understood from the following description taken in connection with the accompanying drawings in which FIGURE 1 shows schematically one embodiment of a photosynthetic apparatus in accordance with this invention; and FIGURE 2 is a detail of an operative sealing arrangement for the embodiment shown in FIGURE 1.

Referring to FIGURE 1, rotating disc 10 is shown, driven by motor 12 through shaft 14. Supported slightly above rotating disc 10 is fixed transparent disc 16 having central aperature 18. Fixed to rim 20 of disc 16 is ring 22 making a rubbing seal against rotating disc 10. Tube 24 carries a culture, which will be described later, to central aperture 18 where it is discharged on rotating disc 10. The rotation of disc 10 spreads the culture in a thin film as it flows to the periphery of the disc. Ring 22 is designed to form an annular channel 26 about disc 10 to collect the culture and to permit the culture to flow around disc 10 to tube 28, an outlet for the culture. Above fixed transparent disc 16 is positioned a source of electromagnetic radiation such as fluorescent lights 30. A sheet of light reflecting material 32 may be positioned above fluoroescent lights 30 in order that the maximum amount of light will fall on the culture flowing over rotating disc 10.

The culture flows through tube 28 to chamber 34 which has, as at least one wall, a membrane 36. Chamber 38 positioned on the opposite side of membrane 36 is supplied with a continuously replenished supply of air rich in carbon dioxide through tube 40. As previously mentioned, due to the photosynthetic process occurring, the culture is rich in oxygen. With a membrane 36 of the proper material, oxygen will diffuse through the membrane to the air and carbon dioxide will diffuse through the membrane to the culture. The air, replenished with oxygen, is removed from chamber 38 through tube 42.

The culture flows from chamber 34 through tube 44 to valve 46 which permits a desired quantity of the continously growing culture to be harvested (removed from the system). In some instances, it may be desired to bleed continously from the system an amount of the culture approximately equal to the increase in the culture due to growth. The harvested algae may then undergo appropriate treatment to put them in a palatable form, while the water and nutrients removed can be returned to the system.

From valve 46 the culture is conveyed via tube 48 to valve 50. Valve 50 permits nutrient and water to be added to the system as required. Suitable nutrients are described in United States Patent 2,732,662. That patent also described the particular strain of algae, *Chlorella pyrenoidosa*, which was utilized in the work here.

At some point in the cycle, pump 52 is provided (here connected to valve 48 by tube 54 and to central aperture 18 by tube 24) to supply the necessary force to circulate the culture through the system. In some situations, for example a zero gravity environment, sufficient pumping action may be achieved by the centrifugal force imparted to the culture by rotating disc 10, thereby eliminating the need for a pump.

Since the apparatus is designed for use in space as well as one earth, it is necessary to prevent uncontrolled movement of any part of the apparatus. The culture, in particular, must be confined to particular desired paths. In the apparatus shown in the drawing, the culture is contained within the apparatus throughout the entire cycle.

In order to maintain the culture in a film of desired thickness as it passes between discs 10 and 16, these discs are spaced from each other from 1 to 5 mm. For a dense culture of ten percent or greater algae, a spacing of 2 mm. or less should be used, while less dense cultures will receive adequate illumination if this spacing is increased.

A source of low intensity electromagnetic radiation was selected for the illustrated embodiment of this invention since it eliminates the need for cooling and also prevents solarization or over illumination of the algae. An artificial light source has certain advantages over using the sun to illuminate, although it adds to the energy requirements of the system. One advantage is that the intensity of illumination is relatively constant and predictable. Moreover, the apparatus is operable over a twenty-four hour period regardless of the relative position of the sun.

As previously mentioned, the photosynthesis which is occurring results in the production of oxygen. Typically, the air contained in the culture as it enters chamber 34 will be about 21% oxygen and approaching zero percent carbon dioxide. The air entering chamber 38 would normally be that which has been exhaled by the astronaut and would have about 14% oxygen and 4.5% carbon dioxide. The air which leaves chamber 38 will have gained oxygen from the culture and given up carbon dioxide to the culture. Under the conditions mentioned above, this air should contain 18% to 19% oxygen and 1% to 1.5% carbon dioxide which would make it suitable for breathing.

The gas exchange occurs according to the phenomenon disclosed in United States Patent 2,966,235, that a gas will diffuse through a semi-permeable membrane from a volume of high gas concentration to one where the concentration is lower. Although not mentioned in that patent, the fact that the air is contained in a liquid does not impede the diffusion process. Moreover, no liquid passes through membrane 36.

It is evident that as the apparatus external to the rotating and fixed discs 10 and 16 respectively is increased in volume, a particular alga will be exposed to light a proportionately decreased percentage of time. Moreover, it can be seen that the most vigorous growth of algae will occur only when the proper amount of illumination is received by them. One estimate is that the algae should be illuminated for ten percent of the time. This figure must be further qualified by pointing out that one hour of illumination followed by nine hours of darkness would not be satisfactory. A more satisfactory cycle would be one completed in one-tenth of a second. Achievement of such a rapid cycle is rendered difficult by the possible damage to the algae cells. It has been found that disc 10 can be rotated at speeds up to 150 r.p.m. without damaging the cells. A lower limit of rotational speed of 70 r.p.m. has been set where the desired thickness of the film has been obtained by the rotation of disc 10 rather than the spacing between discs 10 and 16.

In FIGURE 2 an operative sealing arrangement between rotating disc 10 and fixed disc 16 is shown. Fixed to rim 20 is ring 60 having in profile a generally S-shaped configuration. The bottom portion 64 of ring 60 is positioned in a J-shaped extension 62 of disc 10. If some culture makes its way into extension 62, centrifugal force prevents it from leaving extension 62. An effective seal is therefore made.

While a particular embodiment of a photosynthetic apparatus has been shown and described, it will be obvious that changes and modifications can be made without departing from the spirit of the invention and the scope of the appended claims.

What is claimed as new and desired to be secured by Letters Patent of the United States is:

1. Apparatus for facilitating the growth of a culture of photosynthetic mircoorganisms comprising:
    a disc,
    means for rotating said disc,
    a transparent member substantially parallel and adjacent to but spaced from said disc,
    culture collecting means disposed about the periphery of and establishing a fluid and atmosphere-tight connection between said disc and transparent member,
    a source of electromagnetic radiation positioned to radiate through said transparent member into the space between said disc and said transparent member,
    culture depositing means in fluid and atmosphere-tight communication with said disc and transparent member,
    culture transporting means establishing fluid and atmosphere-tight communication between said culture collecting and depositing means,
    a gas exchanger means for removing oxygen from said culture and for adding carbon dioxide to said culture,
    said culture transporting means being in fluid communication with siad gas exchanger means,
    means for removing culture from said culture transporting means, and
    means for adding nutrients to said culture transporting means.

2. Apparatus for facilitating the growth of a culture of photosynthetic microorganisms comprising:
    a disc,
    means for rotating said disc,
    a transparent member substantially parallel and adjacent to but spaced from said disc,
    culture collecting means disposed about the periphery of and establishing a fluid and atmosphere-tight connection between said disc and transparent member,
    a source of electromagnetic radiation position to radiate through said transparent member into the space between said disc and said transparent member,
    culture depositing means in fluid and atmosphere-tight communication with said disc and transparent member,
    culture transporting means establishing fluid and atmosphere-tight communication between said culture collecting and depositing means,
    a gas exchanger having first and second compartments with a semi-permeable membrane therebetween,
    said culture transporting means being in fluid communication with and passing through said first compartment,
    oxygen output means and carbon dioxide input means in said second compartment,
    means for removing culture from said culture transporting means, and
    means for adding nutrients to said culture transporting means.

3. Apparatus for facilitating the growth of a culture of photosynthetic microorganisms comprising:
    a disc,
    means for rotating said disc attached thereto,
    a transparent member substantially paralled and adjacent to but spaced from said disc,
    said spacing being from 1 to 5 mm.,
    culture collecting means disposed about the periphery of and establishing a fluid and atmosphere-tight connection between said disc and transparent member,
    a source of electromagnetic radiation positioned to radiate through said transparent member into the space between said disc and said transparent member,
    culture depositing means in fluid and atmosphere-tight communication with said disc and transparent member,
    culture transporting means establishing fluid and atmosphere-tight communication between said culture collecting and depositing means,
    a gas exchanger having first and second compartments with a semi-permeable membrane therebetween,
    said culture transporting means being in fluid communication with and passing through said first compartment,
    oxygen output means and carbon dioxide input means in said second compartment, means for removing culture from said culture transporting means, and means for adding nutrients to said culture transporting means.

References Cited by the Examiner

UNITED STATES PATENTS

| | | | |
|---|---|---|---|
| 2,715,795 | 8/1955 | Pallotta et al. | 47—58 |
| 2,732,662 | 1/1956 | Myers et al. | 47—58 |
| 2,854,792 | 10/1958 | Juda | 47—58 |
| 2,966,235 | 12/1960 | Kammermeyer | 183—115 |

OTHER REFERENCES

Algal Culture from Laboratory to Pilot Plant, John S. Burlew.; Carnegie Inst. of Wash. Publ. 600, Wash., D.C., 1953.

"Gardens to Feed Our Spacemen," Richard F. Dempewolff, Popular Mechanics, June 1960, vol. 113, No. 6, pp. 123–127, 236–242 relied on.

"Space Unit Tests Oxygen in Plants," Walter Sullivan, The New York Times, Sunday, Feb. 15, 1959, page 34–L, sec. 1.

ABRAHAM G. STONE, *Primary Examiner.*